United States Patent

[11] 3,571,695

[72] Inventor Robert L. Straiton
Orlando, Fla.
[21] Appl. No. 828,179
[22] Filed May 27, 1969
[45] Patented Mar. 23, 1971
[73] Assignee The United States of America

[54] LOW DISTORTION AC LIMITER
6 Claims, 2 Drawing Figs.

[52] U.S. Cl. .......... 323/9, 307/321, 323/75
[51] Int. Cl. .......... G05f 1/12
[50] Field of Search .......... 323/1.9, 75 (A), 75 (B), 75 (F); 317/33; 307/237, 321

[56] References Cited
UNITED STATES PATENTS 2,316,008 4/1943 Ludbrook .......... 323/75X(F)
2,414,317 1/1947 Middel .......... 323/75(A)

OTHER REFERENCES

" Sine Wave Amplitude Limiter" by H. E. Van Winkle IBM Tech. Disclosure Bulletin Vol. 2 No. 4 Dec. 1959 Pages 29 & 30 Copy in 323/9

*Primary Examiner*—J. D. Miller
*Assistant Examiner*—Gerald Goldberg
*Attorneys*—William G. Gapcynski, Lawrence A. Neureither, Leonard Flank and Harold W. Hilton

ABSTRACT: An alternating current limiter that does not require a harmonic output filter. A reference signal is coupled through a step-up transformer with a center-tapped secondary and is applied across a quad of diodes. The reference signal is inverted and applied across a second quad of diodes. An input signal is applied to both diode quads adjacent to the reference signal input. An output from both quads is connected to a load. The quads conduct alternately and the output signal therefrom is a duplicate of the input signal or a function of the reference signal if the input signal magnitude exceeds a limiting value. The reference signal is either in phase or 180° out of phase with the input signal.

PATENTED MAR 23 1971 3,571,695

Robert L. Straiton,
INVENTOR

BY

Harold W. Hilton

LOW DISTORTION AC LIMITER

SUMMARY OF THE INVENTION

An alternating current limiter has an output signal that duplicates an input signal while the input signal is less than or equal to a limiting value. When the input signal exceeds the magnitude of the limiting value, the output becomes clamped to a reference signal. The output signal is then limited to a voltage level which is a function of the magnitude of the reference signal. Clamping the output signal prevents clipping of the output waveform, thus preventing unwanted harmonics and eliminating the need of filters.

DESCRIPTION OF THE PREFERRED EMBODIMENTS

Figure 1:
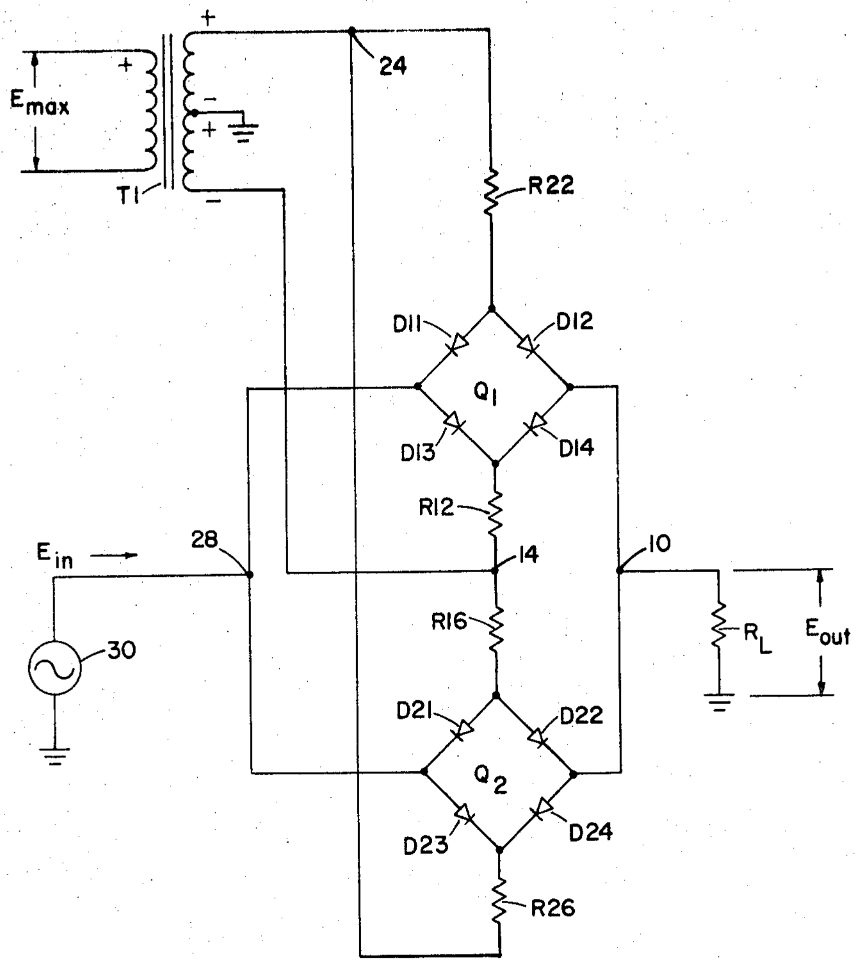
FIG. 1 is a schematic of a preferred embodiment of the invention.

Referring now to the drawings wherein there is disclosed a preferred embodiment of the present invention, like numbers represent like parts in both figures. FIG. 1 discloses a preferred embodiment wherein a first diode quad Q1 is comprised of matched diodes D11, D12, D13 and D14. Diodes D11 and D12 have the anode thereof connected together, and D13 and D14 have the cathodes thereof connected in common. The cathode of D11 is connected to the anode of D13, and the cathode of D12 is connected to the anode of D14. A second diode quad Q2 comprises matched diodes D21, D22, D23 and D24 which are connected similarly to the diodes of Q1. D21 and D22 have the anodes thereof connected in common, D23 and D24 have the cathodes thereof connected in common, the cathode of D21 is connected to the anode of D23, and the cathode of D22 is connected to the anode of D24.

The quads Q1 and Q2 are matched and have several common circuit points. The anode of D14 is connected in common with the anode of D24 at a point 10. A load as represented by resistor $R_L$ is connected between point 10 and the system ground. The cathode of D14 is connected through a resistor R12 to a point 14. A resistor R16 is connected between point 14 and the anode of D22. The anode of D11 is connected through a resistor R12 to a point 14. A resistor R16 is connected between point 14 and the anode of D22. The anode of D11 is connected through a resistor R22 to a point 24 and the cathode of D23 is connected through a resistor R26 to point 24. The cathode of D11 is connected in common with the cathode of D21 at a point 28. An input signal source 30 is connected between point 28 and ground for applying the input signal to the diode quads, Q1 and Q2. Resistors R12, R16, R22 and R26 are equal.

A control or reference signal is applied from a fixed source (not shown) to Q1 and Q2 to m limit the output voltage therefrom to a value whose magnitude is a function of the reference signal value. The reference signal, $E_{max}$, is applied to the primary of a transformer T1. The secondary of T1 has a grounded center tap, one side thereof connected to terminal point 14 and the other side connected to point 24. Reference signal, $E_{max}$, applied to the primary of T1, is stepped up in the secondary thereof, $E_{max}$being developed between point 14 and go ground, and between point 24 and ground. The reference signal as applied to Q1 and Q2 through resistor R12, R16, R22, and R26 is either in phase of 180° degrees out of phase with a signal $E_{in}$ from input source 30.

Input source 30 produces an alternating current with variable magnitude. Regardless of the input signal from source 30, the output developed across $R_L$ is limited to a value less than or equal to $E_{limit}$, a function of $E_{max}$. When $E_{in}$ is 0, the output signal across $R_L$ is 0. For a positive input signal, with $0<E_{in}<E_{limit}$, the output signal is ea equal to $E_{in}$, and with $E_{in}>E_{limit}$, the output signal is limited by the magnitude of $E_{max}$. Similarly, when the input signal is negative, with $0>E_{in}>E_{limit}$, the output signal across $R_L$ is equal to $E_{in}$, and with $E_{in}<E_{limit}$, the output signal is limited by the magnitude of $E_{max}$. With reference signal $E_{max}$ in phase with input signal $E_{in}$ and a positive signal applied to point 28 from source 30, a positive signal is also applied to point 24 from the secondary of T1. Point 14 is negative with respect to point 24 and the diodes of Q2 cannot conduct. When the polarity reverses at point 28 and on the secondary of T1, Q2 will conduct and Q1 is blocked.

In operation, with the output of T1 in phase with the output of signal source 30, a positive input pulse of an alternating current at point 28 is representative of a signal to be developed across load $R_L$. An alternating reference voltage from T1 is simultaneously impressed across Q1 and Q2 with a point 24 being positive. A positive potential at point 24 and a negative potential at point 14 provide an inverse potential across Q2, thus preventing conduction thereof.

Figure 2:
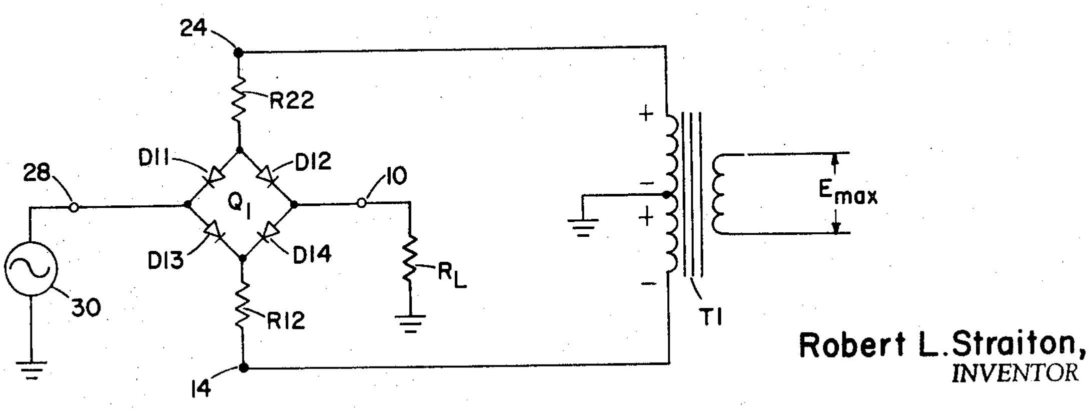
FIG. 2 is a schematic of an equivalent of one-half of the circuit before limitation occurs.

FIG. 2 discloses a simplified schematic wherein Q2 is omitted from the circuit when Q1 is conducting. When $E_{in}$ at point 28 is 0, the load voltage across $R_L$ is also 0, a low impedance path being provided through R22, Q1 and R12 to the secondary of T1. As $E_{in}$ goes positive, $E_{max}$ also goes positive in phase therewith. Prior to limitation, $E_{max}>E_{in}$ and the voltage across load $R_L$ is equal to $E_{in}$. The voltage from transformer T1 is across points 24 and 14 and the diodes of Q1 are forward biased to conduction. The positive voltage at point 28 reduces the biasing across D11 but does not prevent current flow therethrough. $E_{in}$ is positive with respect to the cathode of D13 and finds a path back to source 30 through D13, R12, the secondary of T1 and the center-tap ground of T1. The potential, $E_{in}$, is developed across D13 and R12, with only a very low drop across D13. Thus, the cathode of D14 is maintained near the potential $E_{in}$ by R12, and for D14 to conduct, the anode thereof must be held at or above $E_{in}$. Therefore, as $E_{in}$ varies positively on point 28, point 10 will also have the same potential and phase thereon, since the current flowing through D12 and D13 is equal. Current flow through D12 and D14 is limited by the level of $E_{in}$ felt across D14. Forward current flow through D12 divides into two paths of return, a low resistance path through D14 and R12 to T1, and another path through $R_L$ to ground. The path through $R_L$, having the potential $E_{in}$ developed thereon, provides a return path for the potential $E_{in}$ at point 10.

When signal $E_{in}$ from source 30 equals or exceeds the limiting value of the circuit, the potential at point 28 is more positive than the anode of D11 and D11 is reverse biased. The current path from source 30 is through D13 and R12 to the grounded center tap of T1. The anode of D14 is of equal potential or negative with respect to the cathode thereof and D14 will not conduct. Thus, $E_{max}$ is developed across R22, D12 and $R_L$. Therefore, for $E_{in}\geq E_{limit}$, D11 and D14 are reverse biased and cease conduction, the output voltage across $R_L$ is a function of $E_{max}$, and the output voltage is defined by the equation $$E_{\mathrm{out}}=\frac{(E_{\mathrm{max}}-V_{\mathrm{D}})R_{\mathrm{L}}}{R22+R_{\mathrm{L}}}=E_{\mathrm{limit}} \qquad (1)$$

where $E_{out}$= output voltage, and $V_D$ = diode voltage drop.

At the circuit limiting value, $E_{in}$ is defined by equation (1) where $E_{in} = E_{out}$. The limiting value being that value for $E_{in}$ where the magnitude of the output voltage ceases to follow the signal from source 30 and becomes a function of $E_{max}$.

With a negative input signal in phase with the reference signal, point 28 is negative, point 24 is negative and point 14 is a positive potential. A positive potential at point 14 and a negative potential at point 24 causes an inverse potential across Q1, thus preventing conduction of Q1 and allowing conduction of Q2. The negative half cycle of the output signal is developed across $R_L$ similarly to that previously described for the positive signal. After limitation occurs, D22 and D23 are reverse biased, the input signal path is through D21, R16 and through T1 to ground, and the output signal path is from ground through $R_L$, D24 and R26 to the secondary of T1.

Therefore, when the reference signal is in phase with the input signal, the output voltage across $R_L$ is in phase with the input signal. Before limitation occurs the output voltage is equal in amplitude with and is a function of only $E_{in}$. After limitation occurs, the output voltage magnitude is a function of the reference voltage $E_{max}$.

When the reference signal $E_{max}$ is 180° out of phase with input signal $E_{in}$, a positive input signal at point 28 has a corresponding negative reference signal at point 24 and a positive voltage at point 14. The inverse reference potential developed across Q1 prevents conduction thereof and forward biases Q2 into conduction. Similarly, a negative input signal at point 28 has a corresponding positive reference signal at point 24 and a negative potential at point 14. Q1 is forward biased into conduction and Q2 is reverse biased and cutoff. Thus, the roles of Q1 and Q2 are reversed from that of the in-phase condition. The output voltage across $R_L$ is in phase with the input signal at point 28 with Q2 conducting during the positive half cycle of the input signal and Q1 conducting during the negative portion thereof.

The output signal across $R_L$ is in phase with the input signal $E_{in}$ in all cases. The fundamental frequency remains unchanged by unwanted harmonics, providing a relatively distortionless AC limit. Since the limit, controlled by the reference signal, is reached and exceeded without producing unwanted harmonics, filtering is unnecessary.

Although a particular embodiment and form of this invention has been illustrated, it is obvious to those skilled in the art that modifications may be made without departing from the scope and spirit of the foregoing disclosure. For example, the input signal may be received from such external circuitry as an AC amplifier or single-ended operational amplifier with feedback. Therefore, it is understood that the invention is limited only by the claims appended hereto.

I claim:

1. A low distortion alternating current limiter comprising: input means for supplying a variable voltage signal; reference voltage coupling means for providing a fixed alternating current limiting voltage; first and second passive, voltage responsive means, each having at least an input connected to said coupling means, another input connected to said input means, and an output; a load connected to the outputs of said voltage responsive devices for developing an output signal therein in phase with said input means signal; and the outputs of said first and second means being connected together and to a common side of said load.

2. An alternating current limiter as set forth in claim 1 wherein said first and second voltage responsive means have first, second and third inputs and an output, the first input of said first means being connected to the second input of said second means and to said coupling means, the second input of said first means and the first input of said second means being connected in common and connected to said coupling means, and the third input of said first and second means being connected in common and connected to said input means.

3. An alternating current limiter as set forth in claim 2 wherein said first and said second voltage responsive means is a diode quad, said first and second diode quads each having first, second, third, and fourth semiconductor diodes, said first and third diode being series connected, said second and fourth diode being series connected and further connected in parallel with said first and third diodes in the forward direction between said first and second inputs to allow current flow in each branch when said first input has a positive potential with respect to said second input, said third input being connected between said first and third diodes, and said output being connected between said second and fourth diode.

4. A current limiter as set forth in claim 3 wherein said load is connected between said outputs and a common circuit ground, and said input means is connected between the third inputs of said quads and circuit ground.

5. A current limiter as set forth in claim 4 wherein said coupling means is a stepup transformer having a center tapped secondary, one side of said secondary being connected to said first input of said first diode quad, another side of said secondary being connected to said second input of said first diode quad, and the center tap of said secondary being connected to circuit ground for biasing said first and second quads into conduction during alternate half cycles of said alternating current limiting voltage and thereby coupling a percentage of the limiting voltage through said load in response to said input voltage signal.

6. A current limiter as set forth in claim 5 wherein said first diode quad has first and second resistors connected respectively to said first and second inputs and connected between said inputs and said transformer secondary, said second diode quad has third and fourth resistors connected respectively to said first and second inputs and connected between said inputs and said transformer secondary, and said resistors being of equal value.